(12) United States Patent
Ching

(10) Patent No.: US 11,087,281 B2
(45) Date of Patent: Aug. 10, 2021

(54) SYSTEM AND METHOD OF COMMITMENT MANAGEMENT

(71) Applicant: Wei Ching, Menlo Park, CA (US)

(72) Inventor: Wei Ching, Menlo Park, CA (US)

(73) Assignee: Execusoft Corporation, Menlo Park, CA (US)

( * ) Notice: Subject to any disclaimer, the term of this patent is extended or adjusted under 35 U.S.C. 154(b) by 89 days.

(21) Appl. No.: 16/275,076

(22) Filed: Feb. 13, 2019

(65) Prior Publication Data

US 2019/0180241 A1 Jun. 13, 2019

Related U.S. Application Data

(63) Continuation of application No. 11/031,432, filed on Jan. 7, 2005, now Pat. No. 10,248,930.

(60) Provisional application No. 60/534,875, filed on Jan. 7, 2004.

(51) Int. Cl.
*G06Q 10/10* (2012.01)
(52) U.S. Cl.
CPC .................................. *G06Q 10/10* (2013.01)
(58) Field of Classification Search
None
See application file for complete search history.

(56) References Cited

U.S. PATENT DOCUMENTS

| | | | |
|---|---|---|---|
| 5,093,794 A | 3/1992 | Howie et al. | |
| 5,923,552 A | 7/1999 | Brown et al. | |
| 6,424,979 B1 | 7/2002 | Livingston et al. | |
| 6,606,660 B1 | 8/2003 | Bowman-Amuah | |
| 6,633,878 B1 | 10/2003 | Underwood | |
| 7,181,419 B1 | 2/2007 | Mesaros | |
| 7,389,239 B1 | 6/2008 | Frank et al. | |
| 2001/0044781 A1 | 11/2001 | Shutes | |
| 2002/0065671 A1 | 5/2002 | Goerz et al. | |

(Continued)

OTHER PUBLICATIONS

Sousa et al., "A distributed architecture and negotiation protocol for scheduling in manufacturing systems", Journal of the Franklin Institute 350 (2013) 2936-2948 (Year: 2013).*

(Continued)

*Primary Examiner* — Thomas L Mansfield
(74) *Attorney, Agent, or Firm* — Haverstock & Owens LLP

(57) ABSTRACT

The present invention discloses a system for and method of managing a project that includes one or more tasks. In one embodiment the task comprises a first task dependent on a completion of a second task. The system and method allow a user to display the relationship between the tasks and scheduled completion dates. Those in charge of a task can thus be held accountable. The system comprises a server with a memory for storing a data structure corresponding to a commitment relationship for a task between a requester and a performer, the data structure containing task data corresponding to a commitment date for completing the task; a first host for use by the requester, the first host configured to exchange negotiation messages through the server with a second host for use by the performer, the negotiation messages containing data related to a proposed commitment date for completing the task; and a second host for use by the performer, the second host configured to exchange the negotiation messages through the server with the first host.

33 Claims, 12 Drawing Sheets

(56) References Cited

U.S. PATENT DOCUMENTS

| | | |
|---|---|---|
| 2002/0072994 A1 | 6/2002 | Mori et al. |
| 2002/0095311 A1 | 7/2002 | Donahue |
| 2002/0161602 A1 | 10/2002 | Dougherty et al. |
| 2002/0178036 A1 | 11/2002 | Murata et al. |
| 2003/0106039 A1 | 6/2003 | Rosnow et al. |
| 2003/0137536 A1 | 7/2003 | Hugh |
| 2003/0212610 A1 | 11/2003 | Duffy et al. |
| 2003/0227487 A1 | 12/2003 | Hugh |
| 2004/0006566 A1 | 1/2004 | Taylor et al. |
| 2004/0010513 A1 | 1/2004 | Scherr |
| 2004/0030590 A1 | 2/2004 | Swan et al. |
| 2004/0172371 A1 | 9/2004 | Mitsouka et al. |
| 2004/0243476 A1 | 12/2004 | Borenstein et al. |
| 2017/0235848 A1* | 8/2017 | Van Dusen ........... G06F 16/904 705/12 |

OTHER PUBLICATIONS

Yakura, "Charting Time: Timelines as Temporal Boundary Objects", Academy of Management Journal, 2002, vol. 45, No. 5, pp. 956-970.

Chiu et al., "A Three-Layer Architecture for E-contract Enforcement", Proceedings of the 36th Hawaii Conference of System Sciences, 2003.

\* cited by examiner

| | | |
|---|---|---|
| + Mary | 12/10/04 | 2/20/05 |
| -Bob | Write Chapter 1 | 12/31/04 | 2/1/05 |
| -Tim | Write Chapter 2 | 12/30/04 | 2/1/05 |
| -Teresa | Write Introduction to Chapter 2 | 12/31/04 | 1/17/05 |

330

331 →  + Mary
332 →  -Bob
333 →  -Tim
334 →  -Teresa

File  Admin  G2G  Help

Commitments | Organizations | Documents

- ☐ Sell 100,000 copies of book A
- ☐ Increase the number of total books marketed
- ☐ Generate in-house software for tracking profits
- ☐ Generate sales documents

674

Templates | Commitments

---

675

Parent [____]
State [Negotiating]  In Control [Bill as requester]
Current Version [0.1]  Latest Version [____]  [Version History...]

General | Deliverance | Quotation

Initiator  ○ Request  ● Performer
Request Type
  ● Negotiable  ○ Forced

Name [____] ▽
Requester [____]  Performer [____] ▽  Sell 100,000 copies of Book A
Budget [____] ▽  Contact Start [____] ▽  Contact Finish [____] ▽
Cost [____] ▽  Due Start [____] ▽  Due Finish [____] ▽

☐ Contract Visible to Requester

Comments [ ✉ ✎ 📂 🔍 ]

Task | Documents | Resources | Log

| △ Name | Requester | Performer | Due Start | Due Finish |
|---|---|---|---|---|
| Sell 100,000 copies of book A | Jason | Bill | 2005-01-01 | 2005-12-30 |
| Bind Book | Bill | Susan | 2005-01-01 | 2005-01-12 |
| Collect binding materials | Jane | Tony | 2005-01-01 | 2005-01-01 |
| Edit book | Jim | Tony | 2005-01-01 | 2005-06-01 |
| Write chapters | Carol | Mark | 2005-01-01 | 2005-04-01 |
| Collect drafting materials | Sandy | Nancy | 2005-01-01 | 2005-01-05 |
| Research materials | John | Nicole | 2005-01-01 | 2005-02-05 |
| Market book | William | Jim | 2005-01-01 | 2005-12-30 |

Insert Root Commitment ▽  [+]

670

SYSTEM AND METHOD OF COMMITMENT MANAGEMENT

RELATED APPLICATIONS

This application is a continuation of co-pending U.S. patent application Ser. No. 11/031,432 entitled "A SYSTEM AND METHOD OF COMMITMENT MANAGEMENT", filed Jan. 7, 2005, which claims priority under 35 U.S.C. § 119(e) of the U.S. provisional application Ser. No. 60/534,875 filed on Jan. 7, 2004, and titled "GENESIS: A UNIFIED COMMITMENT MANAGEMENT SOFTWARE METHOD." The U.S. patent application Ser. No. 11/031,432 entitled "A SYSTEM AND METHOD OF COMMITMENT MANAGEMENT", filed Jan. 7, 2005 and the provisional application Ser. No. 60/534,875 filed on Jan. 7, 2004, and titled "GENESIS: A UNIFIED COMMITMENT MANAGEMENT SOFTWARE METHOD" are both hereby incorporated by reference.

FIELD OF THE INVENTION

The present invention is related to the field of project management. More specifically, the present invention is related to managing and coordinating the completion of a project containing one or more tasks.

BACKGROUND OF THE INVENTION

When a work project is small and staff members located near one another, those in charge of the project can easily meet with the staff members to manage work schedules and predict when individual tasks of the project, and thus the project as a whole, is to be completed. Problems arise when projects are larger. These larger projects generally have more staff members assigned to the individual tasks, staff members who are often located at geographically remote locations or who otherwise find it difficult to meet. These individual tasks are often related, with one task depending on the completion of another. A delay in completing one task often has a cascading effect, delaying the completion of other tasks. Moreover, because it is more difficult to meet with these staff members, those in charge have a harder time managing and keeping track of which tasks are behind schedule, negotiating to get the schedule back on track, and therefore determining how long the project is delayed.

Prior art methods of tracking completion dates for tasks in a project include getting verbal commitments from a task leader. These individual commitments were often recorded in meeting minutes or e-mails. Coordinating these individual commitments to determine the completion date for an entire project was thus time consuming and inexact. When the completion date of one task slipped, the commitment dates for all the tasks dependent on it had to be revised. To this end, task leaders for the dependent tasks were notified and meetings were scheduled. During the meetings, managers asked for new completion dates and task leaders asked for more resources, such as money or manpower, to complete the task. After this negotiation process, individual completion dates for all the tasks in a chain of tasks were revised. This entire process was repeated whenever another completion date slipped.

To avoid this lengthy process, task leaders often pushed out their completion dates, to account for any delays that may arise. The resulting artificially extended completion dates generated inaccurate predictions for the completion of the entire project, with the resultant disadvantages in parts procurement, inventory management, marketing analyses, and the like.

SUMMARY OF THE INVENTION

A system and method in accordance with the present invention manage one or more tasks that must be performed to complete a project. In accordance with the system and method, a requester of a task and a performer of the task negotiate resources and a corresponding commitment date to complete the task. The requester, performer, and selected third parties are able to review the status of each task, the relationship of the tasks, and scheduled completion dates for each task. The requester, performer, and selected third parties are also able to query data relating to the tasks and generate reports from that data. The system and method further allow the project to be coordinated so that changes in completion dates for various tasks trigger notification messages to those responsible for other project tasks, allowing those involved to renegotiate scheduled commitment dates. In accordance with the present invention, a requester, a performer, or a third party is a person, an organization, a department, or any other entity capable of requesting, performing, or viewing a task.

In a first aspect of the present invention, a system for managing a task comprises a server, a first host, and a second host. The server has a memory for storing a data structure corresponding to a commitment relationship for a task between a requester and a performer. The data structure contains task data corresponding to a commitment date for completing the task. The first host is for use by the requester and is configured to exchange negotiation messages through the server with a second host for use by the performer. The negotiation messages contain data related to a proposed commitment date for completing the task. The second host is for use by the performer and is configured to exchange the negotiation messages through the server with the first host. Preferably, the server couples the first host to the second host, thereby allowing the data structure and the task data to be accessed from both the first host and the second host. This structure further allows negotiation messages to be exchanged between the first host and the second host.

In one embodiment, the negotiation messages contain data corresponding to resources for completing the task. The resources comprise any one or more of a budget for completing the task and a number of workers for completing the task.

In another embodiment, the server further comprises a commitment management service for exchanging negotiation messages between the first host and the second host; a communications component for sending real-time notifications and instant user messages between the first host and the second host; and a database for storing the task data. The server further comprises a first server process operatively coupled to the first host, the first server process for exchanging information related to the task with the first host; and a second server process operatively coupled to the second host, the second server process for exchanging information related to the task with the second host. The first server process and the second server process are related by the data structure.

In another embodiment, the first host comprises an executing first agent process configured to communicate with the first server process, and the second host comprises an executing second agent process configured to communicate with the second server process. Preferably, the first host and the second host are configured to communicate with the commitment management service according to HTTP and with the communications component according to TCP/IP.

In another embodiment, the data structure comprises a first record corresponding to the requester of the task; a second record corresponding to the performer of the task; and a commitment record corresponding to the task.

In a second aspect of the present invention, a method of managing a task corresponding to a commitment relationship between a requester and a performer of the task comprises communicating between a first host corresponding to the requester and a second host corresponding to the performer to negotiate a commitment for the task through a commitment management service on a server; transmitting negotiation messages between the first host and the second host to determine at least one of a completion date, required resources, an acceptance of a negotiation message, and a declination of a commitment relationship; storing in a database on the server a new version of task data comprising a completion date and required resources; and repeating transmitting and storing until receiving a message indicating either an acceptance or a declination of the commitment relationship.

In a third aspect of the present invention, a system for managing a project divisible into a plurality of tasks is defined by an architecture. The architecture comprises a plurality of objects related by a tree structure. Each object and its corresponding zero or more child objects correspond respectively to a task and its corresponding zero or more component tasks. Furthermore, each object and its corresponding child objects are configured for negotiating resources and committing to a completion date of a corresponding component task.

In a fourth aspect of the present invention, a computer network for managing a project comprising a task divisible into a plurality of tasks comprises a server executing a first process and a second process. The first process corresponds to a requester of a task from the plurality of tasks and the second process corresponds to a performer of the task. The server stores an object used to display a commitment relationship between the requester and the performer. The server further runs a commitment management service to enable the two processes to negotiate on a completion date for completing the task. The two processes don't have to be running at the same time.

In a fifth aspect of the present invention, a method of managing a project comprising one or more tasks divisible into one or more final tasks comprises dividing each task into one or more sub-tasks and negotiating with a plurality of entities each corresponding to one or more of the sub-tasks and receiving a commitment from each of the entities for completing a corresponding sub-task.

In a sixth aspect of the present invention, a method of managing a task comprises dividing a first task into one or more component tasks; assigning the management of the one or more component tasks to a corresponding one or more entities; negotiating with each of the one or more entities a completion date for each of the corresponding tasks; and automatically generating for display on a host system data illustrating the relationship between the first task and each of the component tasks.

In a seventh aspect of the present invention, a method of managing tasks relating to persons from different organizations comprises storing on a server database commitment data corresponding to a structure of an organization, data corresponding to employees of the organization, and commitments between the employees; and sharing the commitment data, thereby enabling a user on a first server to negotiate a commitment with a user on a second server.

BRIEF DESCRIPTION OF THE DRAWINGS

FIG. 4 is a screen shot of a display, showing the relationship between the tasks and committed completion dates stored in the database of FIG. 3.

FIG. 10 shows a screen shot of a graphical user interface for a commitment structure and templates in accordance with the present invention.

DETAILED DESCRIPTION OF THE INVENTION

A system and method in accordance with the present invention allows a project requiring the completion of one or more tasks to be efficiently managed and tracked. In accordance with one embodiment of the invention, parties negotiate the completion of a task, including the resources needed to complete the task and a commitment date for completing the task. Once a commitment date has been agreed to, the parties can view data showing the relationship between the high-level tasks and any related component tasks and the completion dates of each task.

In accordance with another embodiment, the parties can also use search terms to generate reports used to track and otherwise manage the one or more tasks. The system is also capable of notifying parties when a commitment date has slipped, allowing the parties to renegotiate any affected commitment dates. The system and method of the present invention are capable of managing projects having tasks related in complex ways such as by a tree structure. Those in charge of the project can also select a structure or organization of the task, defined by any one of a number of templates. Managers can thus oversee the status of an entire project and allocate resources to bring about the most efficient and timely completion of a project.

Figure 1:
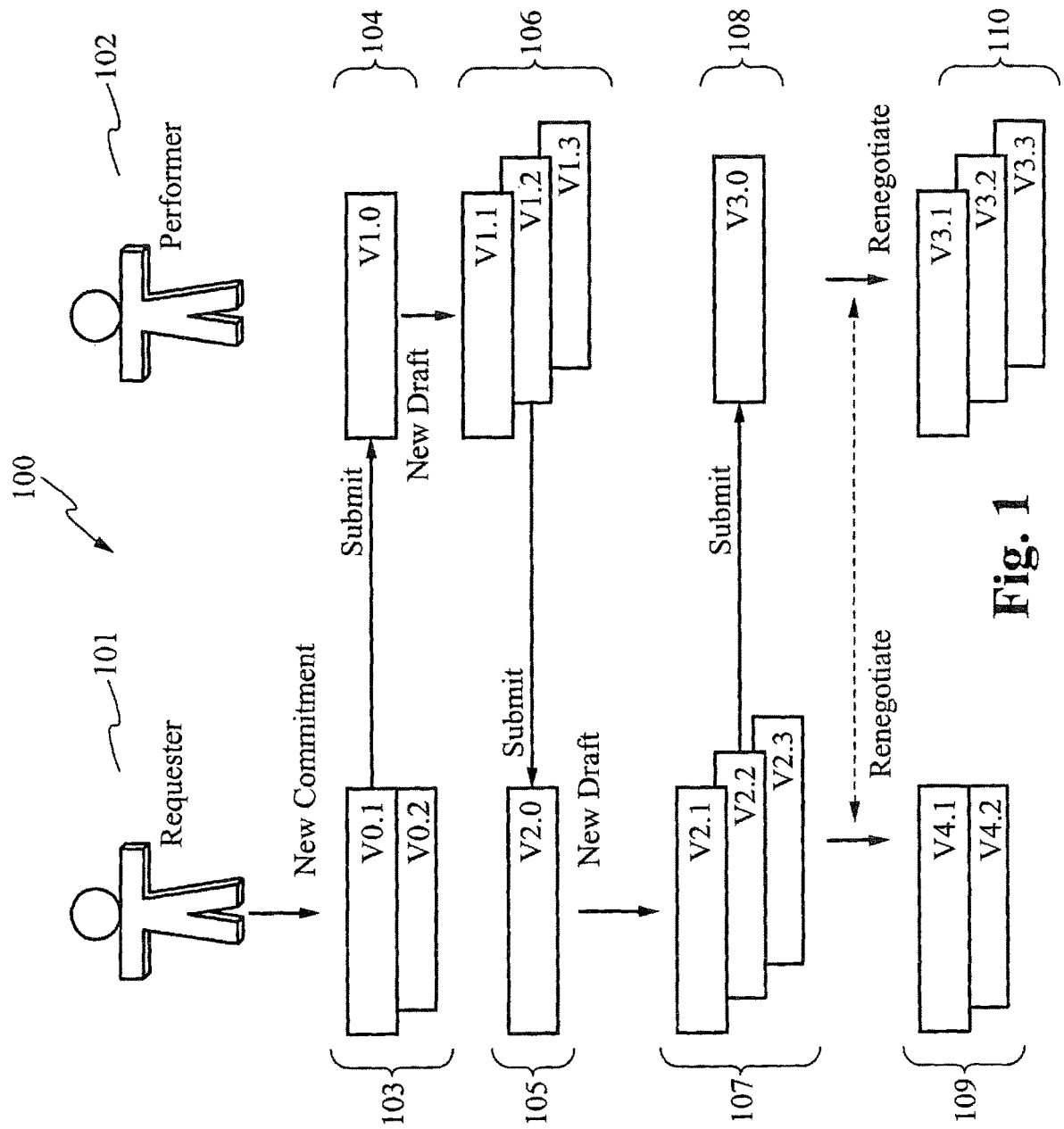
FIG. 1 is a diagram showing negotiating steps between a requester of a task and a performer of the task in accordance with the present invention.

FIG. 1 shows a diagram 100 of the steps of a negotiation process for managing a task requested by a first entity 101 (the requester) to be performed by a second entity 102 (the performer). In one embodiment, the requester 101 receives a first task that is divisible into multiple tasks, each assigned to a performer. In one example, the requester 101 is a manager of a department and the performer 102 is a member of that department. In another example, the requester is an entire department or other organization.

Referring to FIG. 1, in a step 103, the requester 101 generates a first version V0.1 and a second version V0.2 of a work (e.g., task) order, saving copies of both for future reference. In this example, each task order V0.1 and V0.2 contains proposed terms of the task: a description of the task (e.g., write a chapter of a document), a budget for completing the task (e.g., $5,000), the number of workers to be assigned to the task (e.g., 2), and a date for completing the task (e.g., Jan. 1, 2005). The requester 101 then transmits the version V0.1 to the performer 102, labeled on the performer 102 as V1.0. The performer receives the task order V1.0 in the step 104.

The performer 102 is the able to accept the terms of version V1.0 of the task order or create his own task order containing terms that he finds acceptable. For example, in the step 106, the performer 102 generates versions V1.1, V1.2, and V1.3 of the task order. Version V1.1 contains one combination of his proposed terms: the same task (write a chapter of a document), but with a budget of $6,000, more workers assigned to complete this task (3), and a later completion date (Feb. 1, 2005). In versions V1.2 and V1.3, the performer 102 proposes several different task orders with varying terms. The performer 102 then submits to the requester 101 a version of his proposed task order (one of V1.1, V1.2, and V1.3). The requester receives this submitted task order, labeled on the requester side as V2.0, in the step 105.

As shown in FIG. 1, submissions between the requester 101 and the performer 102 continue with the requester 101 generating drafts V2.1. V2.2, and V3.3 in the step 107 and submitting a selected one of them to the performer 102. The performer 102 receives the selected task order, labeled as V3.0 on the performer side, in the step 108. Next, in the step 110, the performer 102 generates versions V3.1, V3.2, and V3.3 in the step 110, and submits a selected one of them to the requester 101, which the requester 101 ultimately uses to generate versions V4.1 and V4.2 in the step 109. This negotiation process continues until both the requester 101 and the performer 102 agree on acceptable task terms, including a commitment date by which the performer 102 agrees to perform the task.

At the end of the negotiation process, both the requester 101 and the performer 102 are bound by (committed to) the negotiated terms: the requester 101 to supply the negotiated resources and the performer 102 to perform the task by the committed completion date. It will be appreciated that in other embodiments of the invention, the requester 101 does not have to commit to supply resources; instead it is only the performer 102 who commits to supply (e.g., complete) the task by a commitment date.

In accordance with the present invention, the requester 101 generates a task order, generates new versions, submits task orders, and receives a task order, all on a requester host (not shown), such as a personal computer, a personal digital assistant, or any other device that supports a negotiation process such as described here. The performer 102 also negotiates using a performer host (not shown) similar to the requester host. Preferably, the requester host and the performer host are different hosts, though they may be the same host. Once the performer 101 and the requester 102 agree on the terms of the task order, data corresponding to the negotiation process is stored in a data structure that is accessible to both the performer host and the requester host. Thus, users on both the performer host and the requester host can thus access the data structure and related data and use them to generate reports showing the relationship between the negotiated task and other tasks that together are required to complete the project. In a preferred embodiment, such as described below, the data structure is stored at a central location accessible to both the requester host and the performer host. In this way, the requester host and the performer host both have the ability to display the relationship between tasks, the completion date for each task, and the terms of each task. Additionally, both the requester host and the performer host both have the ability to display reports relating to the terms. Using these displays, managers are better able to track and otherwise manage the completion of projects.

Figure 2:
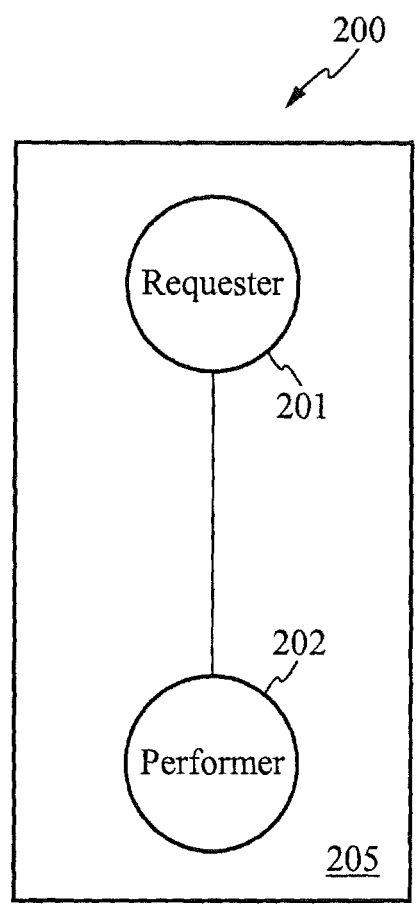
FIG. 2 is a data structure stored in memory and corresponding to the relationship between the requester of the task and the performer of the task in FIG. 1 in accordance with the present invention.

FIG. 2 shows a memory 200 storing a structure 205 having a relationship that mirrors the relationship between a requester 201 of a task and a performer 202 of the task. The relationship of the structure is a simple parent-child relationship. It will be appreciated that many relationships between a requester of a task and the performer of the task, including one or more performers of the task's components tasks, in accordance with the present invention are possible. For example, in one embodiment, illustrated in FIG. 8, the structure is a tree structure, such as when one task comprises two or more component tasks. Thus, within the tree structure, at least one task is both a child of another task and a parent to one or more other tasks. In this and all the embodiments, each task corresponds to a user assigned to manage or perform the task.

Figure 3:
FIG. 3 is a portion of a database with records corresponding to the tasks associated with writing a book.

FIG. 3 shows a database 300 for storing data related to the performance of a task having three component tasks. The data, the structure between its elements (illustrated in more detail in FIG. 4), and the database are all able to be used, either alone or in combination, to present to users a display depicting the relationship between tasks and completion dates. The database 300 comprises a first row 301, a second row 302, a third row 303, and a fourth row 304. Each row contains information related to a particular task. The database 300 also has a row 301 whose headings each describes task data: a first column 311 has the heading Task ID and stores task identifiers; a second column 312 has the heading "Task Name"; a third column 313 has the heading "Requester"; a fifth column 314 has the heading "Performer"; a sixth column 315 has the heading "Start" and contains start dates for tasks; and a sixth column 316 has the heading "Finish" and contains finish dates for tasks. The intersection of a particular row and column contains the task data for the Task ID for that particular row. The second row 302 contains the Task ID "Task1", the Task Name "Write Chapter 1", the Requester "Mary", the Performer "Bob", the Start date "12/31/04", and the Finish date "2/1/05". The third row 303 contains the Task ID "Task2", the Task Name "Write Chapter 2", the Requester "Mary", the Performer "Tim", the Start date "12/30/04", and the Finish date "2/1/05". The fourth row 304 contains the Task ID "Task3", the Task Name "Write Outline for Chapter 2", the Requester "Tim", the Performer "Teresa", the Start date "12/30/04", and the Finish date "12/31/04". It will be appreciated that the row 301 is included merely to describe the data contained in each column of the database 300 and need not be stored in the database 300. The row 301 is optionally stored if, for example, the database 300 is a relational database.

In accordance with the present invention, if the Requestor Mary has a task (the parent task) that depends on the completion of Task1 and Task2 (the component tasks of the parent task), and Task 2 depends on the completion of Task3 (the component task of its parent task, Task 2), the system and method of the present invention assure that the Finish dates of the component tasks are not later than the completion date of a corresponding parent task. In accordance with one embodiment of the present invention, a performer, a requester, or even a third party is able to view the relationship between tasks and completion dates for each task. FIG. 4, for example, is a screen shot of a display 330 corresponding to the rows 301-304 of the database 300 and the relationship between them. The display 400 has rows 331-334 showing data corresponding to Task1, Task2, Task3, and Task4. The display of the data contained in the rows 331-334 is similar to that shown in the database 300 and will not be described here. The row 331 has a "+" sign next to the entry "Mary", indicating to a viewer that "Mary" is a requester. The row 332 has a "−" sign next to the entry "Bob", and the row 333 has a "−" sign next to the entry "Tim". The rows 332 and 333 are both slightly right indented from the row 331, indicating that the Bob and Tim are both performers for the requestor Mary. The row 334 has a "−" sign next to the entry "Teresa" and is slightly right indented from the row 333, indicating that Teresa is a performer for the task requested by Tim.

It will be appreciated that the display 400 is able to be shown to any performer of a task or component task, any requester of a task or a component task, or any third party that is granted permission to view the display 400. In one embodiment, the system described here contains a user file containing a list of users and associated permissions. For example, a first user in the user list is granted permission to view tasks and completion dates relating to the user "Tim" but not those relating to the user "Bob". A second user in the user list may not have permission to view the names or status of any tasks.

Figure 5:
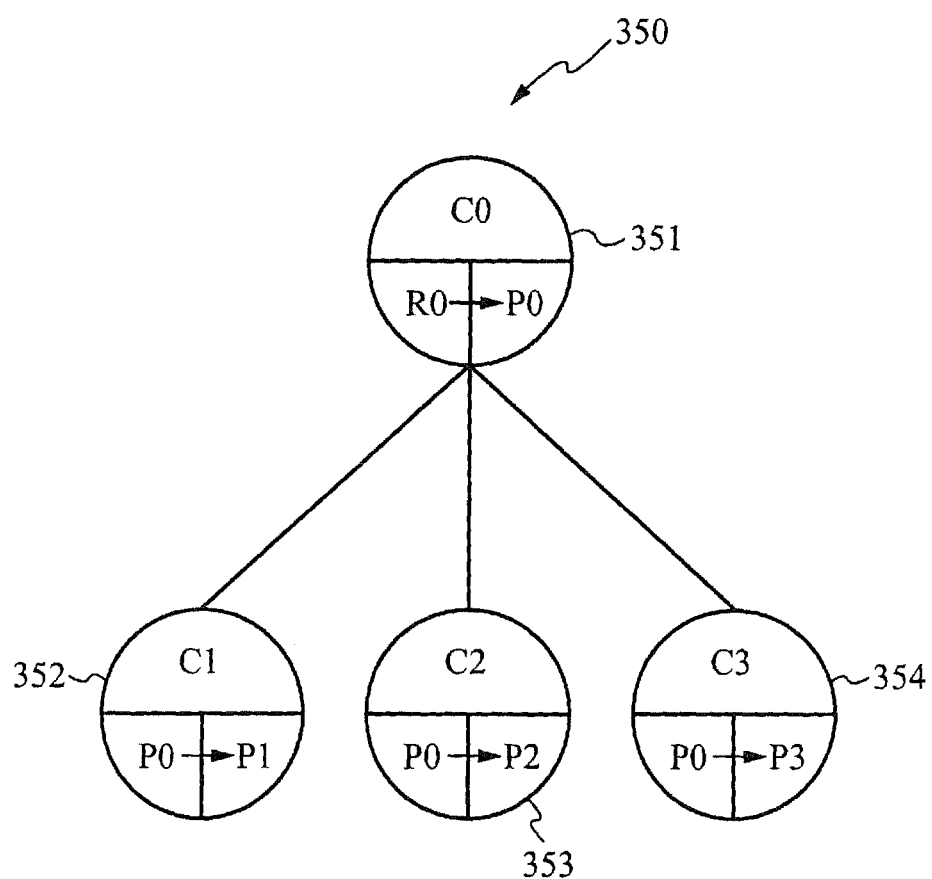
FIG. 5 shows a tree structure showing the relationship between requesters and performers in accordance with the present invention.

FIG. 5 illustrates a general structure 350 between requesters and performers and their associated tasks, in accordance with one embodiment of the present invention. The element 351 corresponds to a commitment C0 between a requester R0 and a performer P0 for completing a task. For the example illustrated in the structure 350, the performer P0 determines that to complete the task, he must get a commitment C1 from a performer P1, a commitment C2 from a performer P2, and a commitment C3 from a performer P3. The performer P0 thus has two roles and two sets of negotiations: to R0, P0 is a performer; and to P1, P2, and P3, P0 is a requester.

When negotiating completion dates, R0 requests that P0 finish C0 before a date D0. P0 requests that P1, P2, and P3 finish their tasks based on the commitments C1, C2, and C3. Thus, the completion date D1 for C1, the completion date D2 for C2, and the completion date D3 for C3, must all come before D0.

While FIG. 5 depicts a commitment tree with four elements 351-354, it will be appreciated that smaller and larger commitment trees are able to be coordinated in accordance with the present invention. Moreover, every participant in a commitment tree is able to use a top-down or down-up style of completion date negotiation to ensure that a task having a commitment is completed before an associated parent task.

As will be described in more detail below, each task is managed by a process executing on one of a requester host, a performer host, or another host. Processes as described herein perform, at the least, any one or more of the following functions: accepts data to generate messages for negotiating commitments, exchanges messages with other processes, and stores data in and retrieves data from a database. Thus, in a preferred embodiment, when a requester host and a performer host communicate, they do so through their respective processes. Because the requester host and the performer host also correspond to tasks, the processes related to the requester host and the performer host are also related by the relationship of the tasks. Thus, in the preferred embodiment, if a first task corresponds to a parent of a second task, the corresponding first process is a parent process of the second task.

Figure 6:
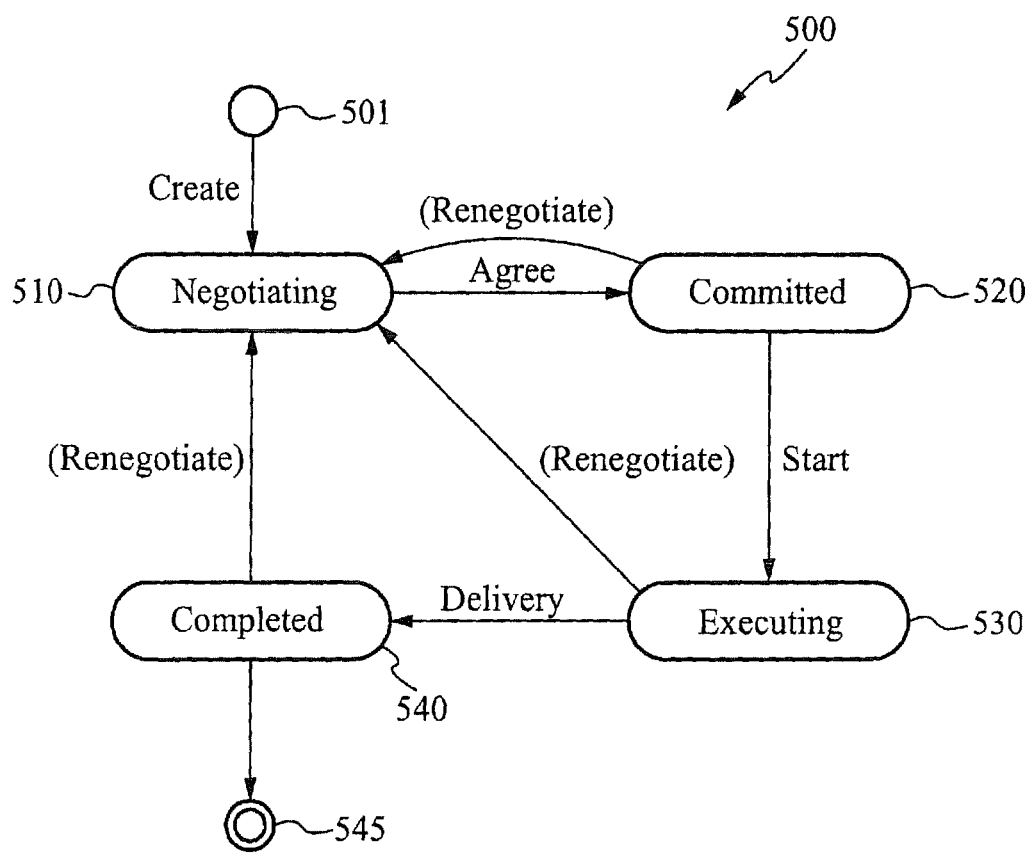
FIG. 6 shows a state diagram for a life cycle of a commitment in accordance with the present invention.

FIG. 6 shows the steps 500 for making a commitment date for the completion of a task. First, in the step 501, the task is generated. This is done in any number of ways. For example, a manager is presented with a graphical user interface (requester GUI) for assigning tasks to an employee (e.g., a performer). In one embodiment, this requester GUI is generated by a process executing on the manager's host computer (the parent process). When the manager assigns the task, the parent process automatically creates a process corresponding to the employee (a child process). In one embodiment, the parent process generates an e-mail message notifying the employee that he has been assigned the task. The parent process and the child process are then used to exchange negotiation messages between the manager and the employee. Other processes are used to store data related to the negotiation process and commitment dates in a memory and database, such as described above in relation to FIGS. 2 and 3.

Again referring to FIG. 5, the manager and the employee then negotiate the task terms in the step 502 and agree on the task terms including a commitment date, binding both the manager and the employee in the step 520. From the step 530, either the step 510 is returned to, with the parties renegotiating the task terms, or the task is started and then, in the step 530, executed. From the step 530, either the step 510 is returned to (again, with the parties renegotiating), or the task is delivered to the manager in the step 540, where it is considered completed. From the step 540, either the parties return to the step 510 (again, with the parties renegotiating), or the finish step 545 is entered.

Figure 7:
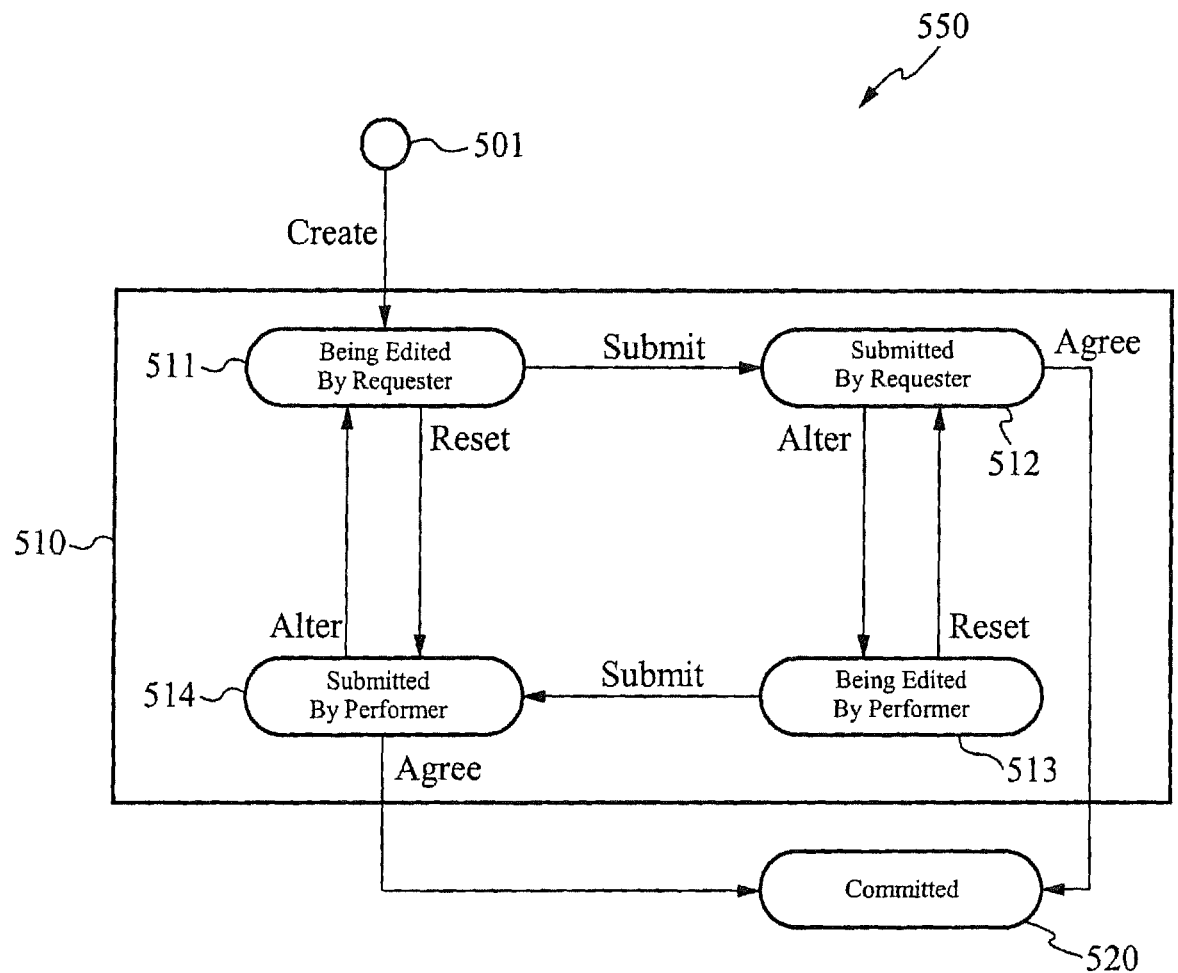
FIG. 7 shows a state diagram for a negotiation process shown in FIG. 5 in accordance with the present invention.
Figure 8:
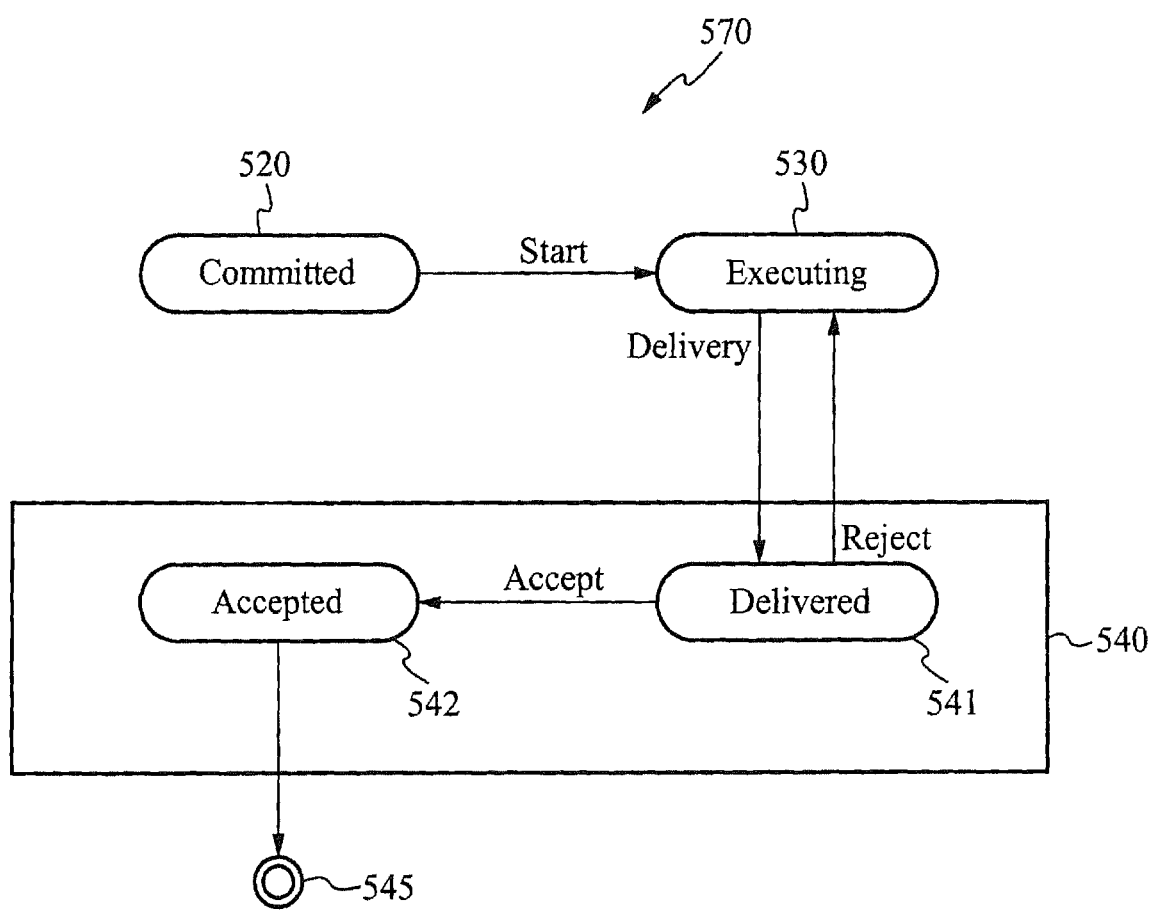
FIG. 8 shows a state diagram for an execution process shown in FIG. 5 in accordance with the present invention.

FIGS. 7 and 8 show two of the individual processes of FIG. 6 in more detail. Like-numbered elements in FIGS. 6-8 refer to the same process step. FIG. 7 shows the start step 501 and details of the negotiation process 510 of FIG. 6. First, in the step 511, the task order is edited by the requester. In the step 512, the task order is submitted to the performer. If the performer agrees to the task order, the process continues to the step 520. Otherwise, the process continues to the step 513, where the performer either alters the task order and submits a new version of the task order to the requester in the step 514, or the performer resets the task order by returning to the step 512, alters it, thereby generating another version of the task order, and returns to the step 513. This sequence of resetting the task order and altering it to create additional versions of the task order can occur any number of times. In the step 514, the process either continues to the step 520, in which the task order is committed, or the task order is altered and the process continues to the step 511, from which the altered version can be reset (e.g., the editing process is aborted and the version of the task order submitted by the requester is accepted), or the process continues to the step 512.

FIG. 8 is a diagram showing the committed step 520 of FIGS. 6 and 7, the executing step 530 of FIG. 6, a more detailed illustration of the completed step 540 of FIG. 6, and the end step 545, also of FIG. 6. As shown in FIG. 8, when the completed step 540 is entered, the process enters a delivered step 541. In the delivered step 541, the task order is either accepted, and the process continues to the step 542, or the task order is rejected, and the process returns to the executing step 530. From the accepted step 542, the process continues to the end step 545.

Figure 9:
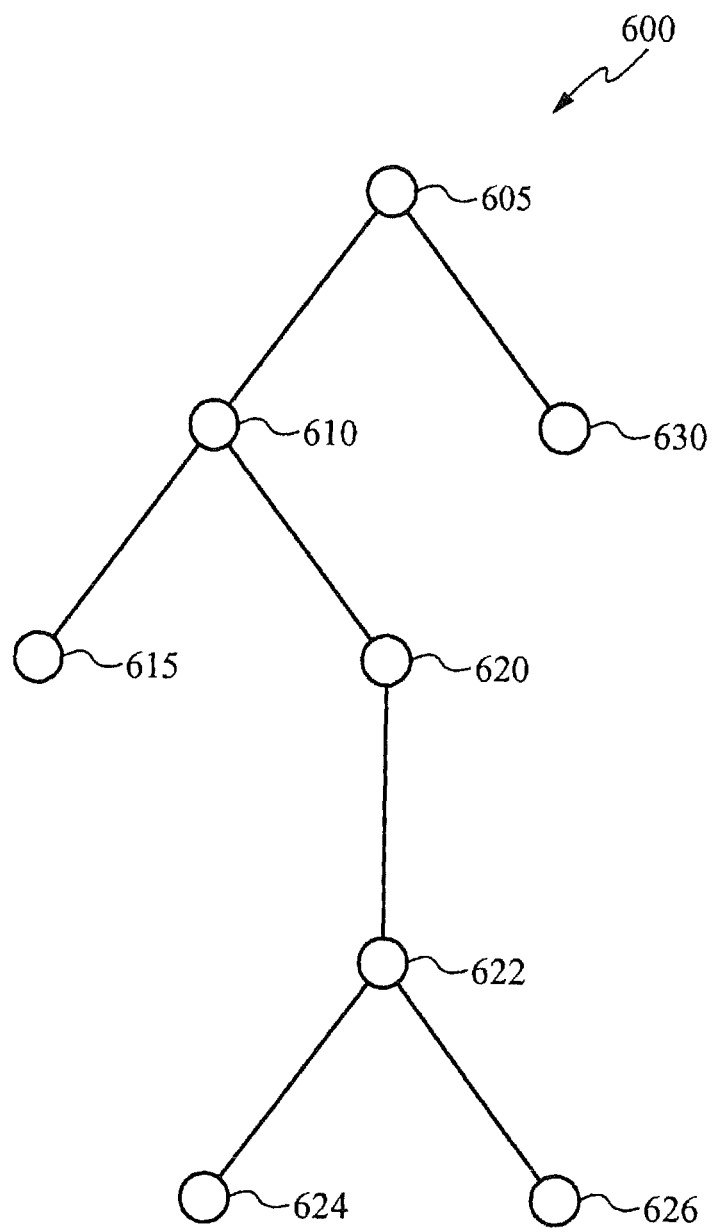
FIG. 9 is a diagram showing a tree structure having nodes that correspond to requesters and performers of tasks that together produce the completion of a project in accordance with the present invention.

As explained above, embodiments of the present invention are well suited for managing complex projects having a plurality of tasks. In the example illustrated in FIG. 9, the project has several tasks that comprise component tasks. FIG. 9 shows a diagram 600 depicting the relationship between tasks for selling a book, the uppermost task 605 corresponding to the task of actually selling the book. The task 605 is divided into its first component task 610 of binding the book and its second component task 630 of marketing the book. In other words, when the two tasks of binding the book 610 and marketing the book 630 are both complete, the book is sold, completing the task 605. What is more, the two tasks 610 and 630 can be performed independently of one another. The task 610 is divided into its first component task 615 and its second component task 620. The task 615 is the task of collecting materials to bind the book, such as collecting a dust jacket and covers; the task 620 is the task of editing the book. The task 620 has its first component task 622 of writing the chapters of the book. The task 622 has its first component task 624 and its second component task 626. The task 624 is the task of collecting materials to draft the chapters, such as paper and a computer running a word processing program. The task 626 is the task of researching material for the individual chapters.

The structure of the diagram 600 is of a tree, with the uppermost task 605 corresponding to the root node of the tree. To simplify the present discussion, each of the elements 605, 610, 615, 620, 622, 624, 626, and 630 refers to a task, a node representing completion of the task, and an entity responsible for completing that task.

Referring to FIG. 9, it will be appreciated that a node can be both a child of one node and a parent of another. Thus, for example, the node 610 is a child of the node 605 and is also a parent of the node 615 and of the node 620. It is also clear that the task 610 cannot be completed until its child tasks 615 and 620 are completed: a book cannot be bound until it is written and the binding materials obtained. Thus, a completion date for the task 610 depends on (the later of) the completion dates of the tasks 615 and 620. When scheduling the completion date of a project, the completion date of a task is first determined and used to determine the completion date of the task's parent task. A change in the completion date of any task (e.g., task 620) will ultimately change the completion date of the task's parent (e.g., task 610) and thus ultimately any descendant of the task (e.g., root task 605). The completion date of the entire project is the completion date of the root task 605.

In accordance with a preferred embodiment of the present invention, the completion date of the project 600 is determined in a top-down manner. In this embodiment, users corresponding to tasks in an upper branch of the tree 600 agree to a completion date for a task. This completion date is thus imposed on users responsible for tasks corresponding to lower branches in the tree 600. Thus, for example, the user responsible for the task 610 and the user responsible for the task 620 agree on a completion date for editing the book. The user responsible for the task 620 then negotiates with the user responsible for the task 622 on a completion date for writing the chapters in the book. This process continues until completion dates for each task in the project are committed to. As described in more detail below, as part of the negotiation between two users, a parent user responsible for a parent task proposes a completion date to its child user responsible for the child task. The child user can agree (e.g., commit) to the proposed completion date or he can propose another completion date. The parent user and the child user continue to negotiate until they agree on a completion date that the child user commits to. Preferably, the completion date is bounded by a completion date negotiated between the parent user and the parent of the parent user.

In a second embodiment, the completion date of the project 600 is determined in a bottom-up manner. In this embodiment, users corresponding to tasks in a lower branch of the tree 600 agree to a completion date for a task. This completion date is thus imposed on users responsible for tasks corresponding to upper branches in the tree 600. Thus, for example, the user responsible for the task 620 and the user responsible for the task 622 agree on a completion date for writing chapters in the book. The user responsible for the task 620 then negotiates with the user responsible for the task 610 on a completion date for binding the book. The process continues from lower nodes in the tree 600 to the upper nodes until completion dates for each task in the project are committed to.

Once completion dates for the component tasks and thus the final project are committed to, a user may later need to revise his commitment date (e.g., to make it earlier or later). The negotiation process is reopened, and all the completion dates depending on the revised commitment date are also renegotiated to determine a new completion date for the project. These renegotiations are initiated automatically. Preferably, users assigned to a parent task of the delayed task are notified of the delay. These users are preferably notified by e-mail, an icon displayed on a GUI generated on their host system, an audible alert, or by some other means.

Alternatively, or additionally, resources available to a requester may change, either increasing or decreasing. In this case, the system is configured to send a notification message to the performer, and the requester and the performer are again able to negotiate a new completion date that the performer will commit to.

As described below, this process of negotiation and commitment is performed using processes that allow the division of a project into component tasks, the exchange of messages containing proposals and commitments, the archiving of these messages to keep a record of the negotiations, and the automatic updating of the completion schedules based on revised completion dates.

In a preferred embodiment, the system of the present invention comprises a plurality of hosts for use, for example, by performers, requesters, and third parties. A performer and a requester use their hosts to exchange messages containing negotiating data. The performer, the requester, and third parties use their hosts to, among other things, view commitment trees and generate reports related to the project. In a preferred embodiment, the system also comprises a server coupled to the performer, requester, and third party hosts. The server stores a copy of the commitment tree and contains programs used to search data related to tasks and generate reports. Using a server has several advantages. First, a central server provides a central location from which third parties are able to access the commitment tree and other data. Second, only the central server, and not the other hosts, needs the processing power and memory for updating a commitment tree and generating reports. Third, the central server is better able to update (e.g., coordinate) the commitment tree and related data. Without the central server, the individual hosts would have to distribute its updates to the commitment tree to the other hosts, difficult to coordinate, especially when the number of hosts is large. Fourth, a central server allows processes to exchange messages using shared memory, such as a message mailbox.

FIG. 10 is a screen shot of a GUI 650 presented to a user of a system of the present invention, such as a requester, a performer, or a third party, for managing and otherwise coordinating tasks used to complete the project 600 shown in FIG. 9. The GUI 650 comprises a first area 670, a second area 674, and a third area 675. The first area 670 depicts the commitment tree related to the project 600. Each row of the first area 670 contains information related to a specific task, with indentations showing the hierarchical relationship between tasks, as described, for example, with reference to FIG. 4. Each row of the first area 670 has entries described by the titles in each column. For example, the first row of data in the first area 670 has a first entry titled "Name" indicating that the name of this task is "Sell 100,000 copies of book A", a second entry titled "Requester" indicates that the person requesting this task is "Jason", a third entry titled "Performer" indicates that "Bill" will perform this task, a fourth entry titled "Due Start" indicates that this task has a committed start date of "2005-01-01", and a fifth entry titled "Due Finish" indicates that this task has a committed completion date of "2005-12-30".

The first area 670 also contains tab buttons labeled "Task", "Documents", "Resources", and Log". When the "Task" button is selected by a user, the task tree (such as illustrated) is displayed. When the "Documents" button is selected, a list of documents related to the tasks is displayed. Examples of these documents include, but are not limited to, parts lists for a task, instructions manuals generated for a task, sales and marketing documents for a task. When a particular document name included in the list is selected, the document is displayed. The first area 670 also contains a button labeled "Commitments", which when selected displays all the commitments stored in the system; a button labeled "Templates", which when selected allows a user to select the structure of (relationship between) tasks; and a button labeled "Insert Root Commitment", which when selected allows a user to insert a root commitment, that is, select an overall manager of a project. The overall manager creates the first task or set of tasks for completing a project.

The second area 674 shows all the projects that are managed by the system, one of which is "Sell 100,000 copies of book A." Each task shown in the second area 674 has a "+" sign next to it, indicating that it is a parent task in a task chain. Selecting a task (by, for example, moving a mouse pointer over it and then clicking the mouse pointer) will expand the entry, thereby showing the child tasks associated with the parent task.

The third area 675 shows data fields and control buttons for entering and displaying information related to the task. For example, the third area 675 shows the parent of the current task (e.g., a task highlighted in the second area 674), the state of the task (whether the parties are in the process of or have completed negotiating its terms), who is in control of the task (e.g., the requester), the version of the task order, the latest version number of the task order, the version history (showing the versions stored or submitted during the negotiation process), general data, delivery data, and quotations, among other things. A user can also provide comments related to the task.

Figure 11:
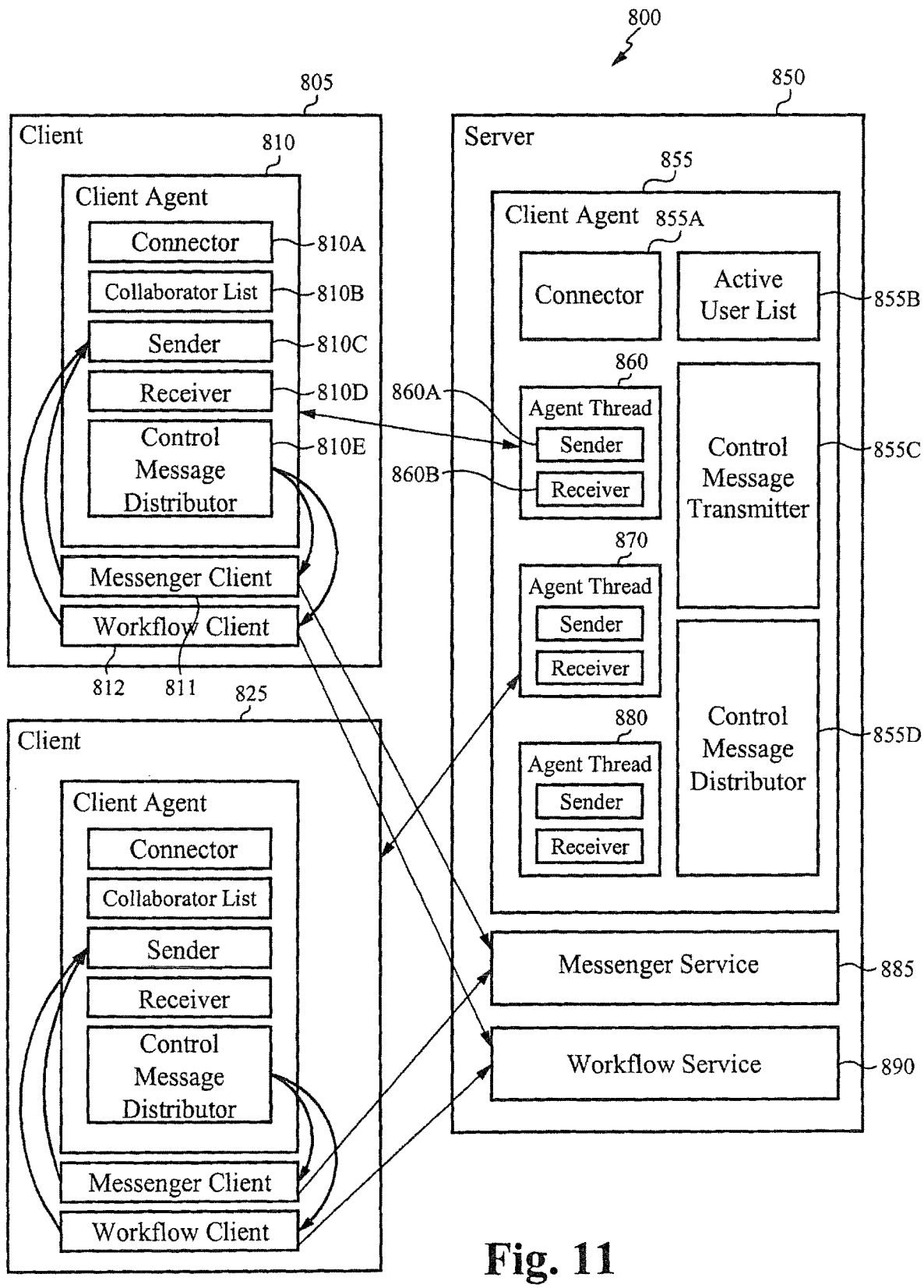
FIG. 11 is a block diagram of two clients, each corresponding to a performer of a task, and a server, for controlling tracking of tasks and communications between the clients in accordance with the present invention.

FIG. 11 is a block diagram showing the components of a system 800 in accordance with one embodiment of the present invention. The system comprises a server 850 coupled to a first host 805 (used, for example, by a manager or other requester) and a second host 825 (used, for example, by an employee or other performer). The server comprises a first client agent 855, a message service component 885, and a workflow service component 890. The message service 885 receives messages from a host (e.g., 805 and 825) and routes it to its corresponding agent thread (e.g., 860 and 870, respectively). The workflow service component 890 receives updates commitments to configure the commitment tree, thereby updating the server's 850 view of the relationships among tasks.

The first client agent 855 comprises (1) a connector 855A for connecting to the first host 805 and the second host 825, (2) an active user list 855B containing names and login information of users granted access to a commitment tree and related data stored on the server 850, (3) a control message transmitter 855C for transmitting control messages to hosts within the same domain as the server 850, (4) a control message distributor for distributing control messages to hosts outside the domain of the server 850, (5) a messenger service 685 for queuing and otherwise controlling messages, (6) a workflow service for controlling the tasks for a project, (7) a first agent thread 860 corresponding to the process relating to the first host 805, (8) a second agent thread 870 corresponding to the process relating to the second host 825, and (9) a third agent thread 880 corresponding to the process related to a third host (not shown). The first agent thread 860 is exemplary of the second agent thread 870 and the third agent thread 880. The first agent thread 860 comprises a sender component 860A for sending messages to the first host 805 and a receiving component for receiving messages from the first host 805.

The first host 805 is exemplary of the second host 825. The first host comprises a client agent 810, a messenger client 811, and a workflow client 812. The client agent 810 comprises a connector 810A for connecting to the agent thread 860, a collaborator list 810B containing the names of any employees assigned to the same task as the user on host 810, a sender 810C, a receiver 810D, and a control message distributor 810E. The control message distributor is configured to send messages to both the messenger client 811 and the workflow client 812. The messenger client 811 and the workflow client 812 are both configured to send messages to the sender 810C.

In operation, the agent threads 860, 870, and 880 each correspond to a task to be managed by the host computers 805, 825, and a third host (not shown), respectively. The agent threads 660, 670, and 680 (e.g., lightweight processes) are configured in a structure that mirrors the relationships of the tasks. For example, referring to both FIGS. 9 and 11, if the agent thread 860 corresponds to the process 622 (managed by a user on the host 605), the agent 870 corresponds to the process 624 (managed by a user on the host 825), and the agent thread 880 corresponds to the process 626 (managed by a user on a host not shown), then the agent thread 660 will be a parent thread to the agent threads 870 and 880. Preferably, when the user on the host 805 generates the tasks 624 and 625 (by, for example, completing data fields in a graphical user interface to assigning the tasks to employees in his department), the agent thread 660 spawns the agent threads 870 and 880.

The components of the system 800 are able to be implemented in many ways. For example, in one embodiment, the hosts 605 and 625 are implemented using Web services such as the Simple Object Access Protocol (SOAP). In other embodiments, the server 650 is implemented using the Microsoft® .NET framework, a database on the server 650 is implemented to support ASP.NET. In still other embodiments, the hosts 605 and 625 and the server 650 are all configured to communicate using a hyper-text transfer protocol (HTTP).

In a preferred embodiment, tasks are managed using processes or lightweight processes (e.g., threads). Processes are configured so that their relationship mirrors that between their corresponding tasks. As one example, a requester process on the server couples the requester host system to the server. The process then exchanges negotiation and other messages with a process corresponding to the performer host system. In this way, the requester host system and the performer host system communicate.

In a preferred embodiment, when a requester accesses the server using a graphical user interface and enters a field to assign a task to a performer, a process relating to the requester task is automatically spawned. The relationship between the requester process (and hence task) and the performer process (and hence) task is accordingly defined. A notification is then transmitted from the requester process to the performer process and thus on to the performer host system, notifying him that he has been assigned the task. The performer process then creates a mirror process on the performer host system. The mirror process allows the user to generate negotiation messages and the like on the performer host system.

Keeping a copy of the negotiation messages on the performer host has several advantages. For example, a performer host system can be disconnected from the server host for a variety of reasons, such as a broken Internet connection. The performer host system can process negotiation commands and task order versions itself. When the connection with the server host is reestablished, the negotiation commands and task order versions are transmitted to the server. The performer host system is thus configured to work off line.

It will be appreciated that in other embodiments, the server 850 contains other components, such as a document module containing documents or links (such as Web addresses) to documents stored at remote locations. Preferably, all of the hosts and attached servers in accordance with the present invention contain Web browsers and other modules that allow them to communicate over the Internet and access documents such as those formatted using hypertext markup language (HTML) and eXtensible markup language (XML) and using protocols as transmission control protocol/Internet Protocol (TCP/IP).

Figure 12:
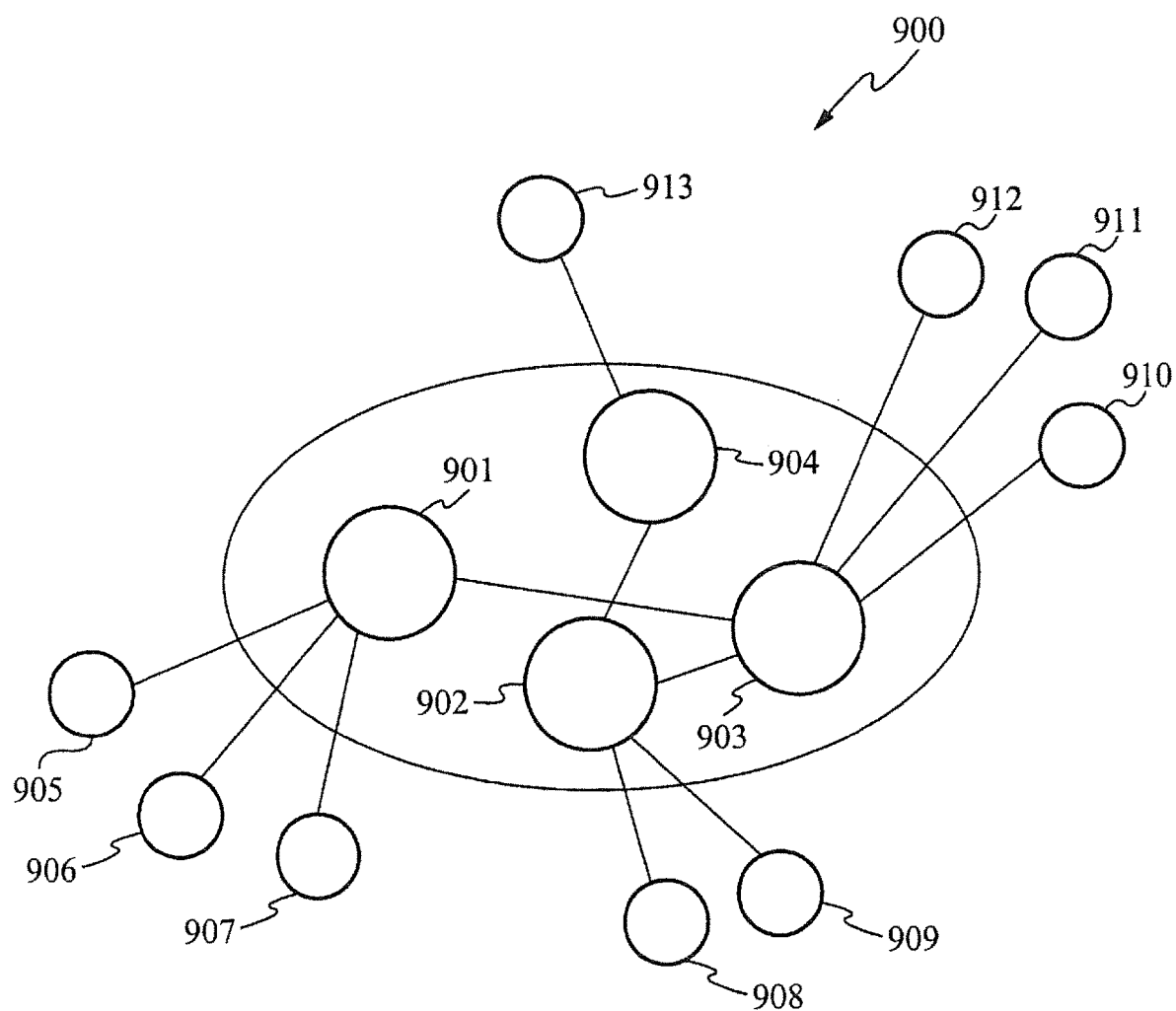
FIG. 12 shows a client-server architecture for managing commitments in accordance with the present invention.

FIG. 12 shows an architecture 900 for a commitment application in accordance with the present invention. The architecture 900 comprises server systems 901-904 and client systems 905-913. The server system 901 is coupled to the server system 903 and the client systems 905-907; the server system 902 is coupled to the server systems 903 and 904 and to the client systems 908 and 909; the server system 903 is coupled to the server systems 901 and 902 and to the client systems 910-912; and the server system 904 is coupled to the server system 902 and to the client system 913. It will be appreciated that server systems and client systems can be coupled to one another in many configurations.

Each server system 901-904 stores at least three types of information: (1) information of an organizational structure and many persons (users) inside it; (2) information of commitments between the users, including the identities of requesters and performers, completion dates, budgets, resources required to perform tasks, specifications relating to the scopes of each task, and the relationship (e.g., parent-child) between commitments; and (3) documents owned by the users and related to the commitments.

In operation, each server system 901-904 starts the client systems coupled to it. Thus, for example, the server system 901 starts the clients 905-907 by starting a user session between the server system and the client. During a user session, a user on a client system is able to view and manage one or more commitments between the user and other users identified on a GUI displayed on the client system. Each user session is able to support a user session, potentially related to multiple commitments, not just a single one. Preferably, these commitments are organized in a tree-like structure.

In the architecture 900, each server system 901-904 comprises a server-side collaboration component, and each client system 905-913 comprises a client-side collaboration component. Each server-side collaboration component and each client-side collaboration component supports real-time communication between the server systems 901-904 and any client system 905-913 that each is coupled to. These real-time communications include notifications and instant user messages.

Each server system 901-904 is configured for server-to-server (peer-to-peer) communications. Thus, each server system 901-904 is able to share person and organization information with another server system, and also allows users to exchange and negotiate commitments across server systems.

It will be readily apparent to one skilled in the art that other various modifications may be made to the embodiments without departing from the spirit and scope of the invention as defined by the appended claims.

What is claimed is:

1. A server device comprising:
a memory configured for storing an application, the application configured for:
exchanging one or more proposed commitment relationships between a requester and a performer over one or more negotiation rounds to determine an accepted commitment relationship by transmitting digital negotiation messages including the proposed commitment relationships between a requester device and a performer device, wherein the one or more proposed commitment relationships comprise one or more task completion dates and resources allocated for completing one or more tasks each including a number of sub tasks;
storing data corresponding to the one or more proposed commitment relationships; and
automatically initiating renegotiations of an accepted completion date of a task between the requester and the performer in the event a completion date for a component of the task is changed by automatically transmitting digital renegotiation messages identifying the task between the requestor device and the performer device, wherein the task and the sub tasks are associated such that the task and the sub tasks form a hierarchical tree structure, wherein a thread corresponds to the task in a structure that mirrors relationships of tasks; and
a processor configured for processing the application.
2. The server device of claim 1 wherein the requester uses a first host computer and the performer uses a second host computer.

3. The server device of claim 2 wherein at least one of the first host computer and the second host computer maintains a copy of negotiation messages in order to maintain operation at least at one of the first host computer and the second host computer if there is no connection to the server device.

4. The server device of claim 2 wherein the memory further stores documents related to the task and accessible to the requester on the first host computer and accessible to the performer on the second host computer.

5. The server device of claim 1 wherein the application is further configured for assigning the task to the performer using an interface.

6. The server device of claim 1 wherein the application is further configured to automatically send a notification that a task completion date has slipped, that a task is assigned to the performer, or both.

7. The server device of claim 1 wherein the application is further configured to reopen negotiations between the requester and the performer when a task completion date is changed.

8. The server device of claim 1 wherein the resources comprise a budget for completing the task and a number of staff for completing a task.

9. The server device of claim 1 wherein the requester and the performer are members of a single business entity.

10. The server device of claim 1 wherein the application is further configured for displaying relationships between the task, the requester, the performer, and a status of the task.

11. The server device of claim 1 wherein a change in a task completion date automatically results in a change in task completion dates of one or more other tasks dependent on the task.

12. The server device of claim 1 wherein the application is further configured for transmitting a notification indicating a change in a task completion date when the task completion date is changed.

13. A server device for communicating with a first host computer used by a requester and a second host computer used by a performer comprising:
 a memory configured for storing an application, the application configured for:
  exchanging one or more proposed commitment relationships between the requester and the performer over one or more negotiation rounds to determine an accepted commitment relationship by transmitting digital negotiation messages including the proposed commitment relationships between a requester device and a performer device, wherein the one or more proposed commitment relationships comprise one or more task completion dates and resources allocated for completing one or more tasks each including a number of sub-tasks;
  storing data corresponding to the one or more proposed commitment relationships; and
  automatically initiating renegotiations of an accepted completion date of a task between the requester and the performer in the event a completion date for a component of the task is changed by automatically transmitting digital renegotiation messages identifying the task between the requestor device and the performer device, wherein the task and the sub tasks are associated such that the task and the sub tasks form a hierarchical tree structure, wherein a thread corresponds to the task in a structure that mirrors relationships of tasks; and
 a processor configured for processing the application.

14. The server device of claim 13 wherein at least one of the first host computer and the second host computer maintains a copy of negotiation messages in order to maintain operation at least at one of the first host computer and the second host computer if there is no connection to the server device.

15. The server device of claim 13 wherein the memory further stores documents related to the task and accessible to the requester on the first host computer and accessible to the performer on the second host computer.

16. The server device of claim 13 wherein the application is further configured for assigning the task to the performer using an interface.

17. The server device of claim 13 wherein the application is further configured to automatically send a notification that a task completion date has slipped, that a task is assigned to the performer, or both.

18. The server device of claim 13 wherein the application is further configured to reopen negotiations between the requester and the performer when a task completion date is changed.

19. The server device of claim 13 wherein the resources comprise a budget for completing the task and a number of staff for completing a task.

20. The server device of claim 13 wherein the requester and the performer are members of a single business entity.

21. The server device of claim 13 wherein the application is further configured for displaying relationships between the task, the requester, the performer, and a status of the task.

22. The server device of claim 13 wherein a change in a task completion date automatically results in a change in task completion dates of one or more other tasks dependent on the task.

23. The server device of claim 13 wherein the application is further configured for transmitting a notification indicating a change in a task completion date when the task completion date is changed.

24. A server device for communicating with one or more host computers each associated with performing a task, requesting performance of a task, or both, wherein the task comprises a number of sub-tasks, with corresponding task completion dates used to determine a project completion date, wherein the relationship between the tasks forms a hierarchical tree structure, the server device comprising:
 a memory configured for storing an application, the application configured for:
  exchanging messages between the one or more host computers for negotiating task completion dates by recording and transmitting digital negotiation messages including proposed commitment relationships between the host computers, such that a change in one of the task completion dates automatically updates the project completion date, wherein the task and the sub-tasks are associated such that the task and sub-tasks form a hierarchical tree structure, wherein a thread corresponds to the task in a structure that mirrors relationships of tasks, further wherein at least one of the one or more host computers maintains a copy of the negotiation messages in order to maintain operation at the one or more host computers if there is no connection to the server; and
 a processor configured for processing the application.

25. The server device of claim 24 wherein the memory further stores documents related to the task and accessible to the requester on one of the one or more host computers and accessible to the performer on one of the one or more host computers.

26. The server device of claim 24 wherein the application is further configured for assigning the task to the performer using an interface.

27. The server device of claim 24 wherein the application is further configured to automatically send a notification that a task completion date has slipped, that a task is assigned to the performer, or both.

28. The server device of claim 24 wherein the application is further configured to reopen negotiations between the requester and the performer when a task completion date is changed.

29. The server device of claim 24 wherein the resources comprise a budget for completing the task and a number of staff for completing a task.

30. The server device of claim 24 wherein the requester and the performer are members of a single business entity.

31. The server device of claim 24 wherein the application is further configured for displaying relationships between the task, the requester, the performer, and a status of the task.

32. The server device of claim 24 wherein a change in a task completion date automatically results in a change in task completion dates of one or more other tasks dependent on the task.

33. The server device of claim 24 wherein the application is further configured for transmitting a notification indicating a change in a task completion date when the task completion date is changed.

* * * * *